Sept. 1, 1959  G. W. MILLER  2,901,834
CHAIN SAW GAUGE
Filed Sept. 17, 1957

Gerald W. Miller
INVENTOR.

BY *(signatures)*
Attorneys

United States Patent Office 2,901,834
Patented Sept. 1, 1959

2,901,834
CHAIN SAW GAUGE
Gerald W. Miller, Yale, Ill.
Application September 17, 1957, Serial No. 684,485
3 Claims. (Cl. 33—202)

This invention relates generally to gauges, and more specifically to a chain saw gauge, for gauging the various dimensions of chain saw teeth.

A sawing chain for a power saw must be kept sharp to get the maximum efficiency. Therefore, when the cutters lose their edge, it becomes necessary to file the saw teeth, to put them back into the proper cutting condition. However, it is very important to remove equal amounts of metal from each cutting tooth, or else the saw would bind in the cut, feed very hard, or have a tendency to grab. For this reason, previously in the art, when sharpening cutter saw teeth, it has been necessary to count the number of filed strokes given to each portion of each tooth, so as to remove equal amount of metal from the tooth. Obviously, this is a very inefficient manner for determining how much metal has been removed from each tooth. Furthermore, the original sharpening angles must be filed as closely as possible in order to get maximum efficiency in the cutting action. When the original proper angles have been followed, it has been found that cutters that have been filed down to one-quarter of their original length have performed as well as a new chain. Therefore, the primary object of this invention is to provide a versatile chain saw gauge which may be used to check the angles of the chain saw teeth, as well as checking various other dimensions, so that the same amount of metal will be removed from each tooth.

Another object of this invention is to provide a gauge for a chain saw, which is transparent, so that the gauge may be used more easily.

A further object of the invention is to produce a simple and inexpensive device and yet one which will be exceedingly effective for the purpose for which it is designed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, the numeral 10 generally designates the chain saw gauge comprising the present invention. This gauge comprises a channel member including an upper bight portion 12, and leg portions 14 and 16. Channel member formed by portions 12, 14 and 16, is made of a transparent material, and is tapered inwardly along its longitudinal length.

Figures 3, 4:
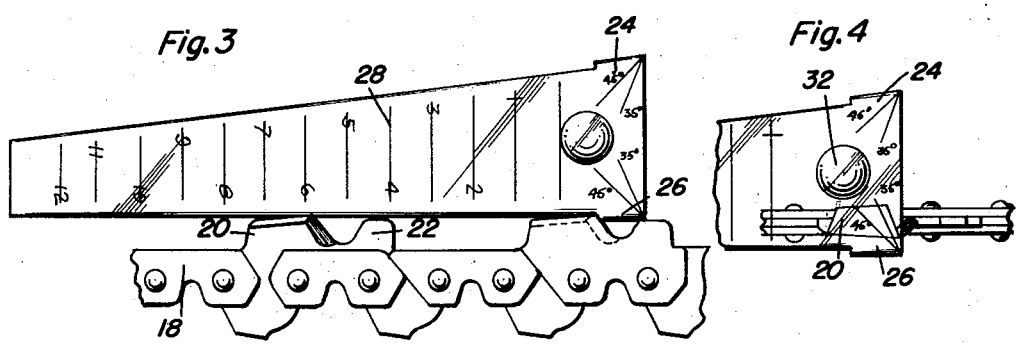
Figure 3 is an elevational plan view, illustrating the use of the gauge for determining the proper height of the tooth in relation to the cutting tooth.
Figure 4 is an elevational plane view illustrating the use of the gauge to determine the proper cutting angle of the cutting tooth.
Figure 5:
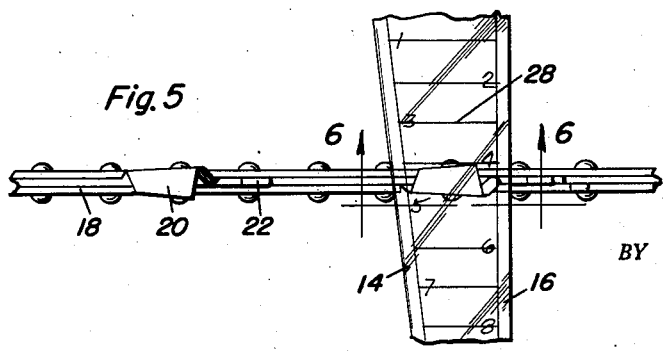
Figure 5 is an elevational plane view illustrating the use of the gauge to determine the proper length of a tooth.

In Figure 3 may be seen a side view of the chain saw with which the gauge is to be used. This chain saw comprises links 18 which connect the respective teeth together. The cutting tooth 20 and drag tooth 22 are connected to the chain. The cutting tooth 20, as can be seen in Figure 5, is curved upwardly, and alternating teeth have the curved portion facing in opposite directions. The drag tooth 22 which precedes the cutting tooth 20, acts as a depth gauge for the cutting tooth, as well as the cleaning element for removing saw dust from the cutting area. Because of the specific use of the drag teeth 22, they are not quite as high as the cutting teeth 20.

Figure 1:
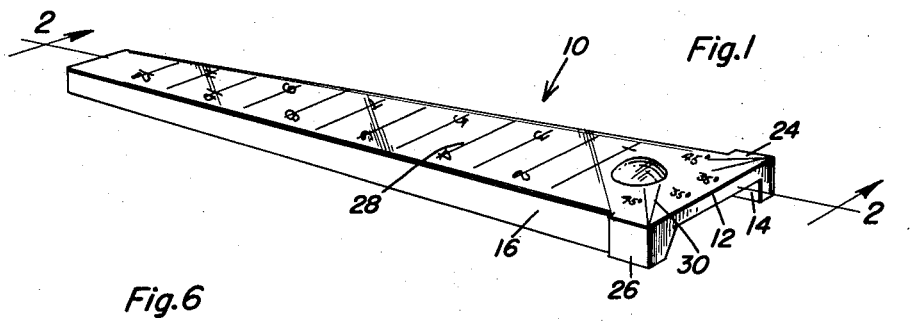
Figure 1 is a perspective view of the chain saw gauge comprising the present invention.
Figure 6:
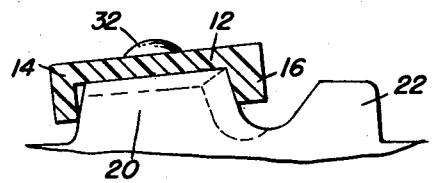
Figure 6 is a vertical sectional view taken substantially along the plane defined by reference line 6—6 of Figure 5.
Figure 2:
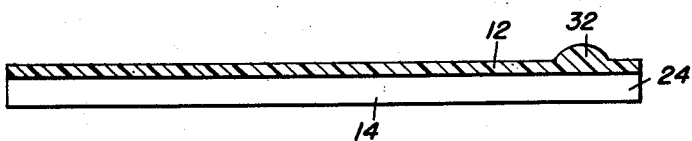
Figure 2 is a vertical sectional view taken substantially along the plane defined by reference line 2—2 of Figure 1.

At the wider end of the tapered channel member, are extensions 24 and 26, projecting outwardly from the ends of legs 14 and 16 respectively. It may be seen that the inner surface of leg 16 is inclined downwardly and outwardly at the proper angle which should be formed by the juncture of the front edge and top surface of the cutting teeth. As can be seen in Figure 6, when the gauge is slid over the top surface of a tooth, as shown in Figure 5, the gauge being tapered will come to a point where it will stop. At this point the indicia 28 on the upper surface of bight portion 12 will indicate the length of a cutting tooth, and the tapered inner portion of leg 16 will indicate the proper angle which should be formed by the juncture of the edge and the top surface of the cutting tooth.

Looking now at Figure 3 in particular, it may be seen that the highest points of the cutting teeth 20 are located against the leg 16, and that the projection 26 is in contacting relation with the upper surface of drag tooth 22, whereupon there is a proper distance between the height of the drag teeth and cutting teeth.

At the wider end of the tapered channel member, on the upper surface of bight portion 12, are a plurality of angular lines 30 having indicia therewith. These lines extend in diverging relation, from a common point at the corner of the wider end of the tapered channel member. Referring now to Figure 4 in particular, it can be seen that when the gauge is placed over a cutting tooth, the leading edge of the cutting tooth may be gauged to determine whether or not the angle thereof is correct for a proper cutting action.

A magnifying lens 32 is located at the wider portion of the tapered channel member, to aid an operator when inspecting the chain saw teeth, after they have been filed for sharpening.

As can be seen in the drawings, the upper surface of bight portion 12 has transverse spaced parallel lines thereon with numbers affixed thereto. This indicia will be used when determining the length of the respective teeth. It is to be noted that all of the lines and indicia that are placed on this transparent gauge will be opaque, so as to be more clearly distinguished.

It may now be seen that I have invented a new and improved type of chain saw gauge, which may be used to compare the various dimensions of the chain saw teeth, so as to make them closer in uniformity when filing the teeth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gauge for a chain saw comprising a transparent tapered channel body having offset edges at the wider end of said tapered body, measuring indicia on the upper surface of said body, including a plurality of transverse, spaced, parallel, opaque lines, and a plurality of opaque lines on the upper surface of said body diverging from a common point.

2. A gauge for a chain saw comprising a transparent tapered channel body having offset edges at the wider end of said tapered body, measuring indicia on the upper surface of said body, including a plurality of transverse, spaced, parallel, opaque lines, and at least one group of a plurality of opaque lines on the upper surface of said body diverging from a common point, each common point being located at a different corner of the wider end of said body.

3. A gauge for a chain saw comprising a transparent tapered channel body having offset edges at the wider end of said tapered body, measuring indicia on the upper surface of said body, including a plurality of transverse, spaced, parallel, opaque lines, and a plurality of opaque lines on the upper surface of said body diverging from a common point, said body having a magnifying lens located therein.

References Cited in the file of this patent

UNITED STATES PATENTS

| | | |
|---|---|---|
| 2,612,702 | Pearce | Oct. 7, 1952 |
| 2,677,892 | Schecter | May 11, 1954 |
| 2,705,376 | Cox | Apr. 5, 1955 |
| 2,735,185 | Naphtal | Feb. 21, 1956 |